United States Patent [19]
Jang et al.

[11] Patent Number: 6,049,473
[45] Date of Patent: Apr. 11, 2000

[54] HARMONIC-INJECTION CONTROL TECHNIQUE FOR THREE-PHASE, DISCONTINUOUS-CONDUCTION-MODE, HIGH-POWER-FACTOR BOOST RECTIFIERS WITH IMPROVED LINE-TRANSIENT RESPONSE

[75] Inventors: Yungtaek Jang, Apex; Milan M. Jovanovic, Cary, both of N.C.

[73] Assignee: Delta Electronics, Inc., Taipei, Taiwan

[21] Appl. No.: 09/249,743

[22] Filed: Feb. 11, 1999

[51] Int. Cl.[7] ........................................... H02M 5/42
[52] U.S. Cl. .................................. 363/89; 363/44
[58] Field of Search ................. 363/44–48, 84, 363/87, 89, 125, 127; 323/222

[56] References Cited

U.S. PATENT DOCUMENTS

| | | | |
|---|---|---|---|
| 4,940,929 | 7/1990 | Williams | 323/222 |
| 5,568,041 | 10/1996 | Hesterman | 363/89 |
| 5,847,944 | 12/1998 | Jang et al. | 363/44 |
| 5,867,379 | 2/1999 | Maksimovic et al. | 363/89 |

OTHER PUBLICATIONS

"Feed–Forward Pulse–Width Modulators For Switching Power Converters", Barry Arbetter, Dragan Maksimovic, IEEE, Jun. 1995, pp. 601–607.

"Optimal Feed–Forward Compensation for PWM DC/DC Converters with 'Linear' and 'Quadratic' Conversion Ratio", Luigi Calderone, etc., IEEE, Apr. 1992, pp. 349–355.

*Primary Examiner*—Matthew Nguyen
*Attorney, Agent, or Firm*—Skjerven, Morrill, MacPherson, Franklin & Friel LLP; Edward C. Kwok

[57] ABSTRACT

A three-phase discontinuous-conduction-mode (DCM), pulse-width-modulated (PWM) boost rectifier using harmonic-injection control is provided with a feedforward path to vary the duty cycle of the PWM modulator according to the input voltage, so as to provide improved transient response. In one embodiment, the feedforward path provides to the PWM modulator a ramp voltage that has a slope proportional to the magnitude of the input line voltage. In one embodiment, the harmonic injection signal is summed with the error signal of an output feedback loop. In another embodiment, the harmonic injection signal is integrated and summed with the ramp voltage of the feedforward path. Moreover, by adding a nonlinear gain control circuit, the DC gain of the DCM boost rectifier at light load is adaptively reduced to achieve stability of the rectifier at light load.

10 Claims, 13 Drawing Sheets

$$f_h = \frac{1}{2\pi R_b C_b} < \frac{360 Hz}{10}$$

HARMONIC-INJECTION CONTROL TECHNIQUE FOR THREE-PHASE, DISCONTINUOUS-CONDUCTION-MODE, HIGH-POWER-FACTOR BOOST RECTIFIERS WITH IMPROVED LINE-TRANSIENT RESPONSE

BACKGROUND OF THE INVENTION

1. Field of the Invention

The present invention relates to single-switch, three-phase, discontinuous-conduction-mode boost rectifiers. In particular, the present invention relates to such boost rectifiers with input-line-voltage feedforward harmonic-injection control.

2. Description of the Prior Art

Three-phase, discontinuous-conduction-mode (DCM), pulse-width-modulated (PWM) boost rectifiers are often used for three-phase, high-power-factor (HPF) applications, since their input-current waveshape automatically follows the input-voltage waveshape and since they achieve high efficiencies because the reverse-recovery-related losses of the boost diode are eliminated. However, if a DCM, PWM boost rectifier is implemented with conventional low-bandwidth, output-voltage feedback control at a constant switching frequency, which keeps the duty cycle of the switch constant during a rectified line period, the rectifier input current exhibits a relatively large $5^{th}$-order harmonic. As a result, as described in U.S. Pat. No. 5,847,944, to meet the maximum permissible harmonic-current levels defined by the IEC555-2 specification at a power level of 5 kW or above, the $5^{th}$-order harmonic imposes severe design, performance, and cost trade-offs.

Figure 1:
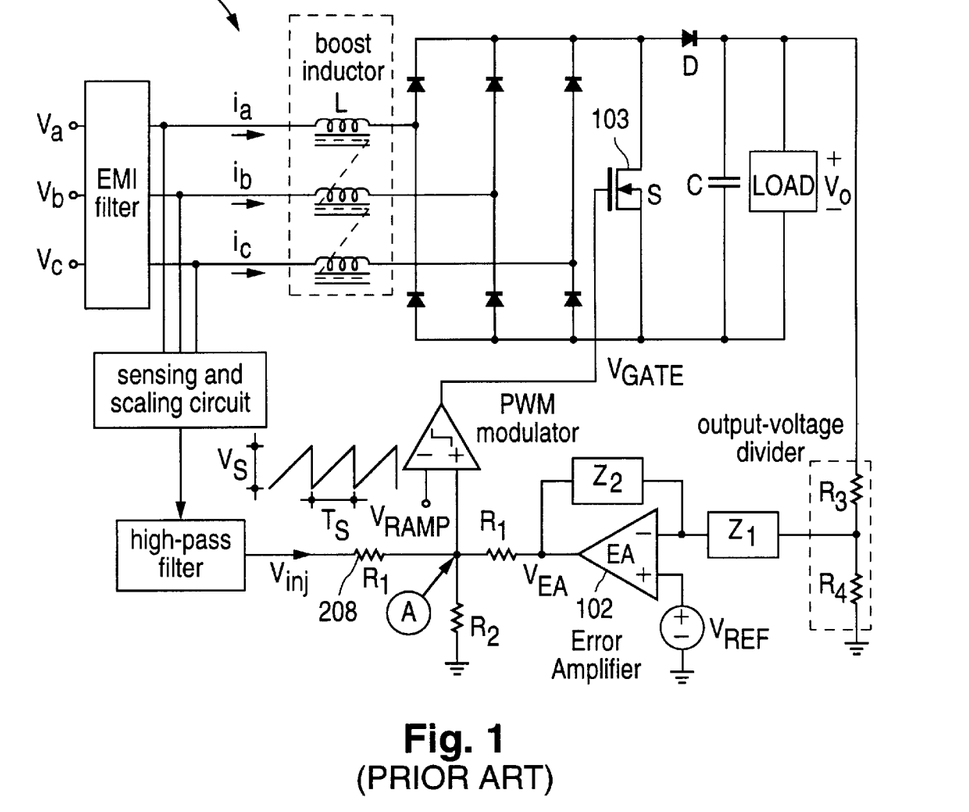
FIG. 1 shows the block diagram of a robust, three-phase DCM boost rectifier, using a simple injection technique.

To meet the IEC555-2 specifications at power levels above 5 kW, a three-phase, constant-frequency, constant-duty-cycle DCM boost rectifier is designed either with a higher voltage-conversion ratio M (i.e., higher output voltage $V_O$) or with a control circuit which employs a harmonic-injection technique. Generally, for a given line voltage, a larger M requires a boost switch with a higher voltage rating because of the increased voltage stress. The harmonic-injection approach, however, does not increase the voltage stress of the boost switch, and requires only a few additional components for its implementation. FIG. 1 shows the block diagram of a robust, three-phase DCM boost rectifier, using a simple injection technique developed by Delta Electronics, Inc., which is described in the aforementioned U.S. Pat. No. 5,847,944. Under this technique a voltage signal ($V_{EA}$), which is proportional to the inverted AC component of the rectified, three-phase, line-to-line input voltages is injected into the output-voltage feedback loop to vary the duty cycle of the rectifier within a line cycle to reduce the $5^{th}$-order harmonic and improve the total harmonic distortion (THD) of the rectifier input currents.

Figure 2A:
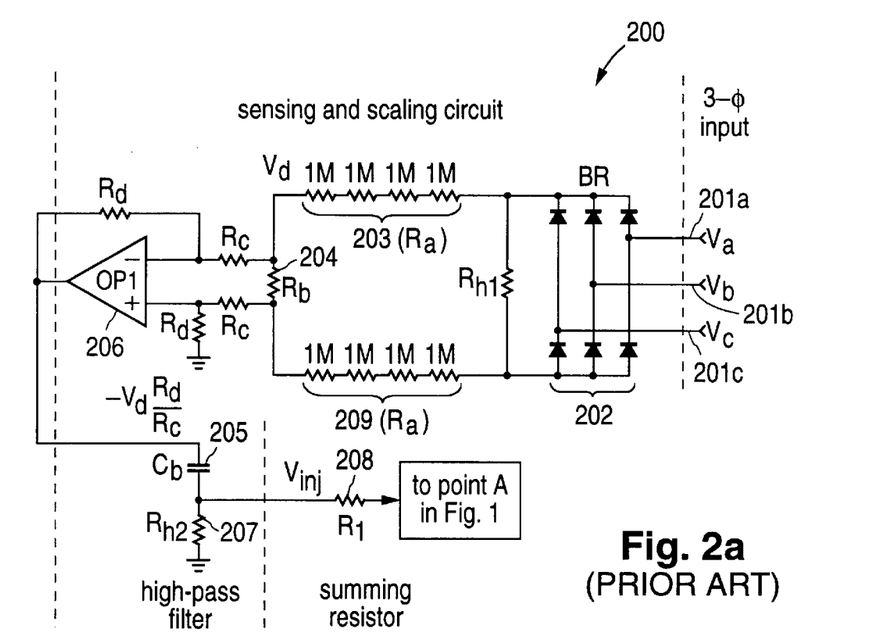
Figure 2B:
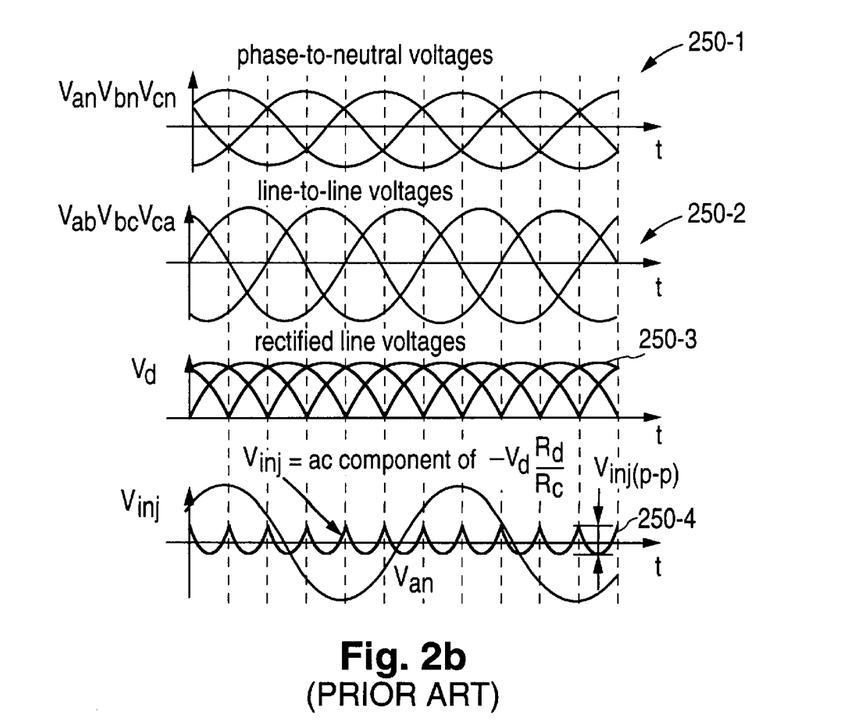

Various circuit implementations of this injection technique were described in the aforementioned U.S. Pat. No. 5,847,944. An implementation of the harmonic injection circuit 200 and its key waveforms 250-1 to 250-4 are shown in FIGS. 2(a) and 2(b). As shown in FIG. 2(a), the three-phase line voltage, represented by input signals $V_a$, $V_b$ and $V_c$ at terminals 201-a, 201-b and 201-c, is first rectified by three-phase bridge rectifier 202, and then attenuated by the resistive voltage divider formed by resistors 203 ($R_a$), 209 ($R_a$) and 204 ($R_b$). Phase-to-neutral voltage waveforms and the line-to-line voltage waveforms for $V_a$, $V_b$ and $V_c$ are shown as waveforms 250-1 and 250-2, respectively. The scaled-down line voltage $V_d$ across resistor 204, which is shown as waveform 250-3 in FIG. 2(b), is then inverted by difference amplifier 206 before filtering by a high-pass filter formed by capacitor 205 ($C_b$) and resistor 207 ($R_{h2}$) to remove the DC component of voltage $V_d$ and to generate injection signal $V_{inj}$ which is shown as voltage waveform 250-4 in FIG. 2(b). Finally, injection signal $V_{inj}$ is injected into circuit 100 in FIG. 1 at point A through summing resistor 208 ($R_1$).

The ratio between the peak-to-peak magnitude of injected signal $V_{inj(p-p)}$ of FIG. 2(b) and the magnitude of feedback control signal $V_{EA}$ (i.e., the output voltage of error-amplifier 104 of FIG. 1) defines modulation index m:

$$m = \frac{V_{inj(p-p)}}{V_{EA}\left(1 - \cos\frac{\pi}{6}\right)}$$

Figure 3:
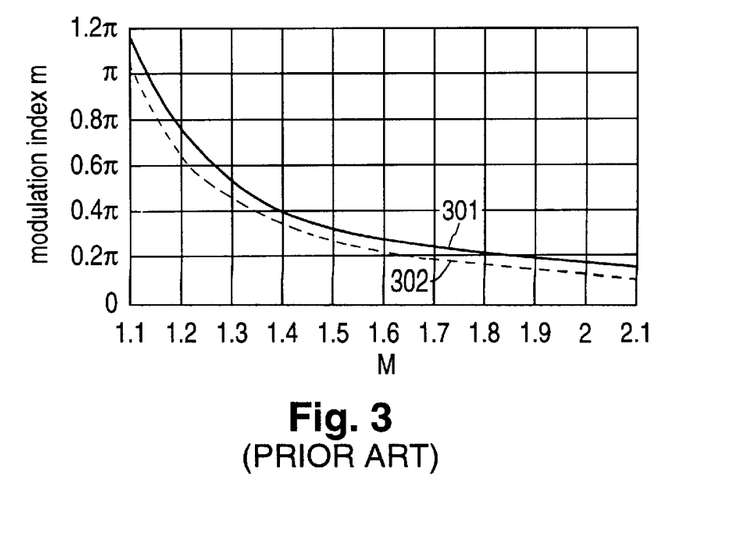
FIG. 3 shows optimal modulation index m versus voltage conversion ratio M for minimum THD (curve 301) and for maximum output power (curve 302), using an injection method of this invention.

At any given voltage-conversion ratio M, an optimal modulation index m which produces the minimum THD can be determined. FIG. 3 shows, on curve 301, the calculated values of optimal modulation index m for the minimum THD as a function of M. To maximize the input power of the boost rectifier at which the IEC555-2 specifications are met, the optimal modulation index m is achieved when the ratio of the $7^{th}$-order harmonic and the $5^{th}$-order harmonic is equal to corresponding IEC555-2 limits. Higher-order harmonics, which are easily eliminated by an EMI filter, are not significant in comparison with the $5^{th}$ and $7^{th}$-order harmonics. FIG. 3 also shows, on curve 302, the calculated values of optimal modulation index m for achieving maximum input power as a function of M.

Injection circuit 200 of FIG. 2(a) cannot provide a modulation index m which varies with the line voltage (i.e., which varies with M). To implement a harmonic-injection scheme with a variable modulation index, a variable-gain amplifier in the harmonic-injection needs to be added to circuit 200.

Figure 4:
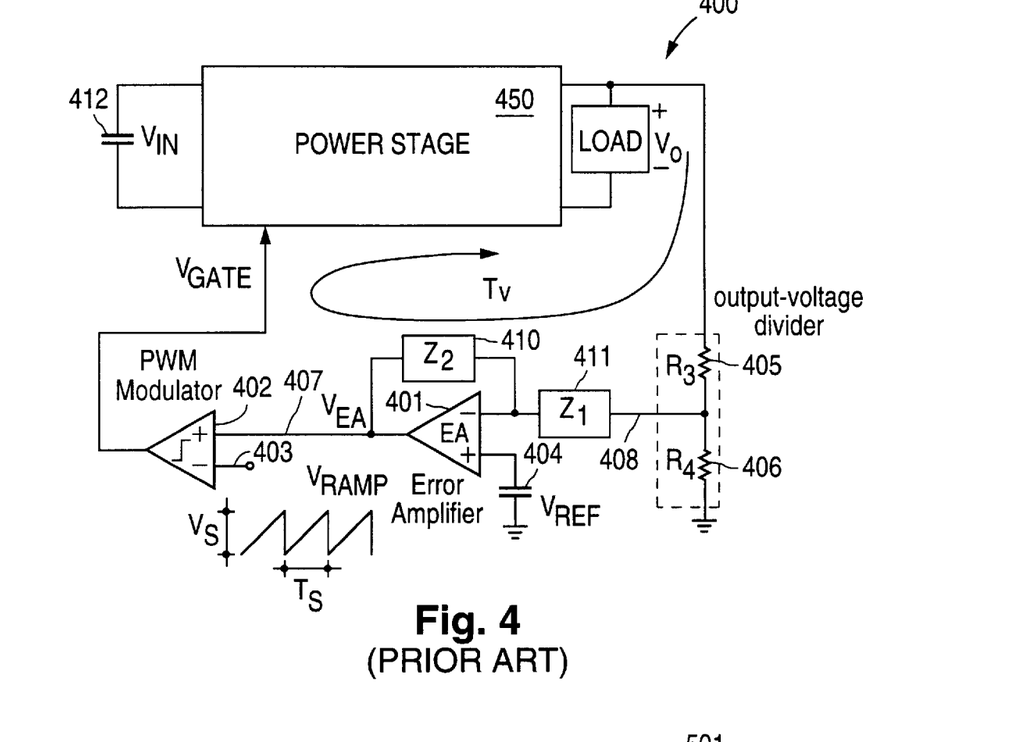
FIG. 4 shows a block diagram of a conventional output-voltage-feedback control circuit 400 for a power stage 450 connected to an input voltage source 412 ($V_{IN}$).

Generally, to achieve a low THD, the bandwidth of the output-voltage-feedback control loop of the boost rectifier used in HPF applications is made much less than the line frequency. As a result, the transient response of the control loop to line and load changes is slow, thus causing high transient deviations of the output voltage from the steady-state value. To further explain the effect of a low loop bandwidth on the performance of the converter, FIG. 4 shows a block diagram of a conventional output-voltage-feedback control circuit 400 for a power stage 450 connected to an input voltage source 412 ($V_{IN}$). Control circuit 400 includes error amplifier (EA) 401, PWM modulator 402, a signal generator providing a constant-frequency, sawtooth ramp voltage signal ($V_{RAMP}$) at terminal 403, a signal generator 404 providing a reference voltage ($V_{REF}$), and a voltage divider including resistors 405 ($R_3$) and 406 ($R_4$). In FIG. 4, the divider of resistors 405 and 406 scales down output voltage $V_O$ for comparison with reference voltage $V_{REF}$ in error amplifier 401. The voltage $V_{EA}$ at the output terminal 407 of error amplifier 401 is proportional to the voltage difference between the scaled output voltage at terminal 408 and reference voltage $V_{REF}$. Voltage $V_{EA}$ is then compared to the sawtooth ramp voltage $V_{RAMP}$ at PWM modulator 402 to generate a switch control signal $V_{Switch}$ with the desirable duty cycle to drive switch 103 of FIG. 1. Because of the negative feedback in the output voltage feedback control loop ($T_V$), error-amplifier output voltage $V_{EA}$ maintains output voltage $V_O$ substantially constant by appropriately modulating the duty cycle of switch control signal $V_{Switch}$. Compensation impedances 411 ($Z_1$) and 410

($Z_2$) of error amplifier 401 provides an appropriate gain, bandwidth, and frequency compensation to maintain circuit 400 stable for all operating conditions.

Figure 5:
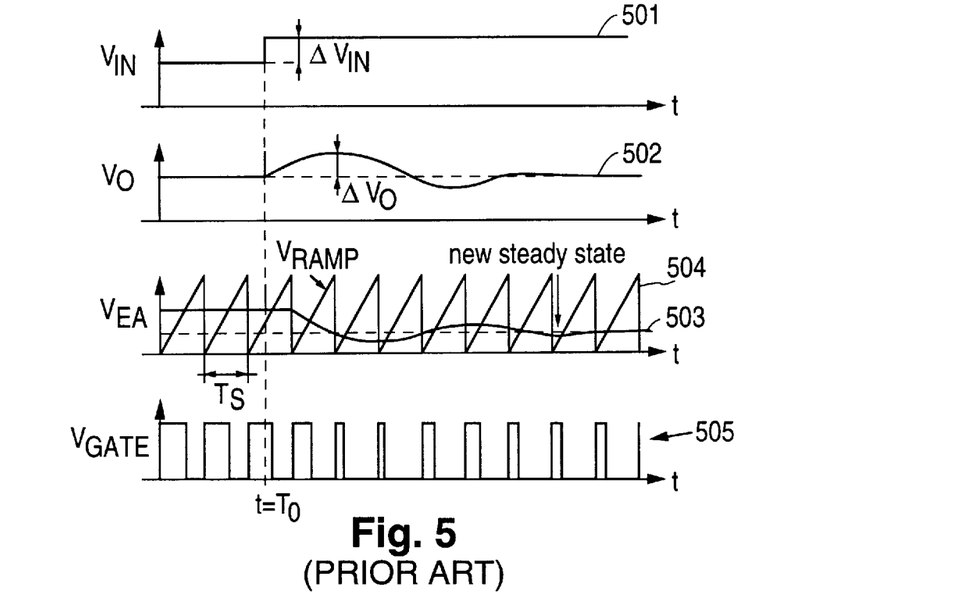
FIG. 5 shows the transient responses of voltage $V_O$, voltage $V_{EA}$ and voltage $V_{RAMP}$, and switch control signal $V_{Gate}$ (i.e., waveforms 502, 503, 504 and 505 ) of the circuit in FIG. 4 with a low-bandwidth output-voltage-feedback control circuit 400, in response to a positive step line-voltage increase $\Delta V_{IN}$ at time $t=T_O$ (waveform 501).

FIG. 5 shows the transient responses of voltage $V_O$, voltages $V_{EA}$ and $V_{RAMP}$, and switch control signal $V_{Gate}$ (i.e., waveforms 502, 503, 504 and 505) of circuit shown in FIG. 4 with a low-bandwidth output-voltage-feedback control circuit 400 in response to a positive step line-voltage increase $\Delta V_{IN}$ at time $t=T_O$. However, because of slow response of control circuit 400, voltage $V_{EA}$ changes slowly, so that the duty cycle of switch control signal $V_{GATE}$ also changes slowly. Consequently, a high transient overshoot in output voltage $V_O$ is seen. Because of such an overshoot, power-stage semiconductor components with a higher voltage rating, hence more expensive and more lossy, are usually required to maintain the necessary design margin between the maximum voltage stress of the components and their voltage rating.

Figure 6:
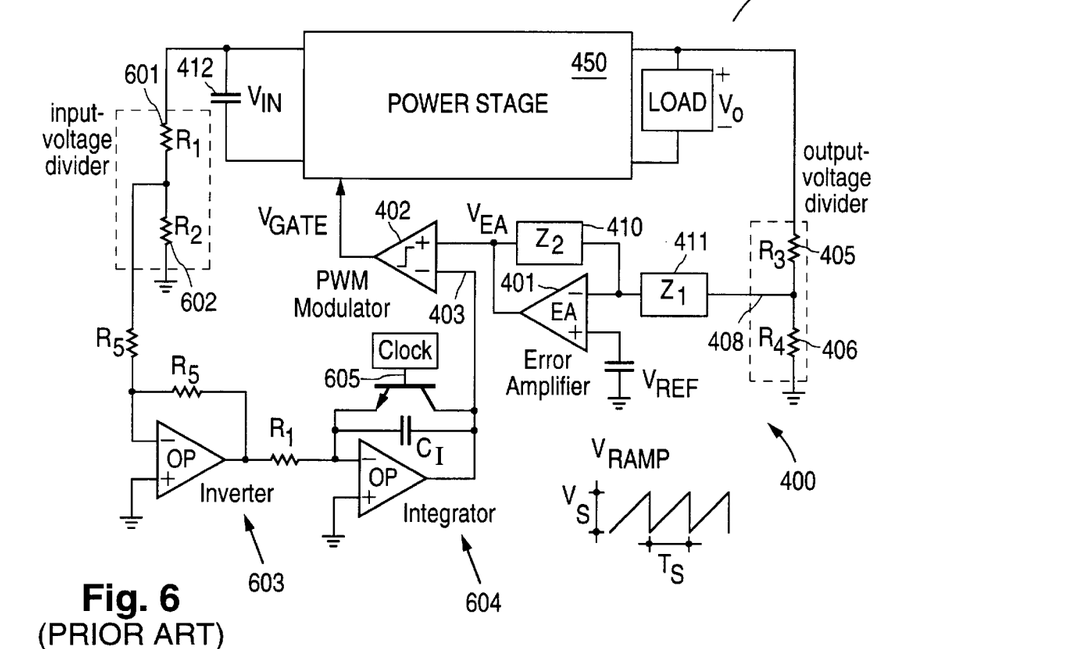
FIG. 6 is a block diagram showing a feedforward control circuit 600 operating in conjunction with feedback control circuit 400 of FIG. 4.

To reduce the above transient output-voltage overshoot caused by a change in the input voltage, a feedforward control technique (illustrated by feedforward circuit 600 of FIG. 6) is developed to provide a faster response in control circuit 400 to input voltage changes. Using feedforward control circuit 600, instead of a fixed-slope sawtooth ramp, the input signal (i.e., voltage $V_{RAMP}$) of PWM modulator 402 is a variable slope ramp that is proportional to input voltage $V_{IN}$. Input voltage $V_{IN}$ is first sensed and attenuated by the voltage divider formed by resistors 601 ($R_1$) and 602 ($R_2$) and then inverted by inverting circuit 603, before being integrated by integrator circuit 604. Integrator circuit 604 is reset at the beginning of each switching cycle by an external, fixed-frequency clock signal on terminal 605.

Figure 7:
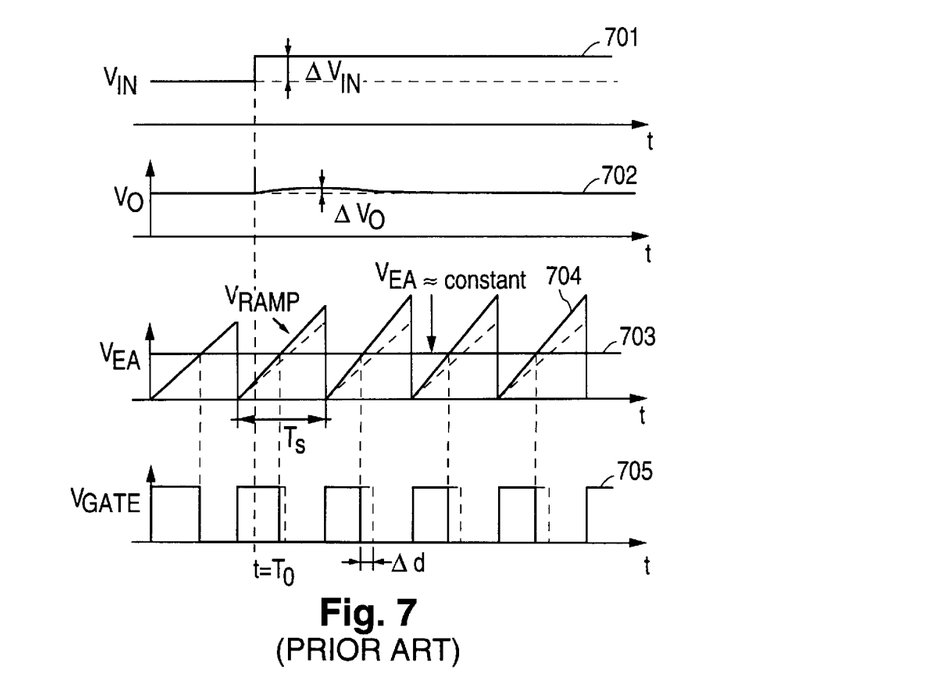
FIG. 7 shows the transient responses of voltage $V_O$, voltage $V_{EA}$ and voltage $V_{RAMP}$, and switch control signal $V_{Gate}$ (i.e., waveforms 702, 703, 704 and 705) of the circuit of FIG. 6, with a low-bandwidth output-voltage-feedback control circuit 400 and feedforward circuit 600, in response to a positive step line-voltage increase $\Delta V_{IN}$ at time $t=T_O$ (waveform 701).

Because of feedforward control circuit 600, the duty cycle of switch control signal $V_{Gate}$ is determined by the voltage $V_{EA}$ of error amplifier 401 and the input-voltage dependent $V_{RAMP}$ provided by integrator circuit 604. Thus, a change in input voltage $V_{IN}$ causes, within one switching cycle, a change in the duty cycle of switch control signal $V_{Gate}$, even while the bandwidth of control circuit 400 remains low (i.e., voltage $V_{EA}$ changes slowly). FIG. 7 shows the transient responses of voltage $V_O$ voltage $V_{EA}$ and voltage $V_{RAMP}$, and switch control signal $V_{Gate}$ (i.e., waveforms 702, 703, 704 and 705 ) of the circuit in FIG. 6 with a low-bandwidth output-voltage-feedback control circuit 400 and feedforward circuit 600, in response to a positive step line-voltage increase $\Delta V_{IN}$ at time $t=T_O$ (waveform 701 ). In FIG. 7, after input voltage $V_{IN}$ is increased at time $t=T_O$, the slope of voltage $V_{RAMP}$ increases, so that the duty cycle of switch control signal $V_{Gate}$ decreases immediately to reduce any overshoot in output voltage $V_O$. As shown in FIG. 7, the response of voltage $V_{EA}$ of error amplifier 401 remains slow, since the bandwidth of control circuit 400 remains unchanged.

SUMMARY OF THE INVENTION

In accordance with the present invention, a feedforward harmonic-injection control circuit provides an improved transient response to a rectifier's output voltage. In a method of the present invention, a low total harmonic distortion (THD) and a fast transient response of the output voltage to line-voltage perturbations are achieved simultaneously. The improved transient behavior of the rectifier is obtained by bringing a signal proportional to the line voltage directly to an input terminal of a PWM modulator to modulate the duty-cycle of the PWM modulator. Consequently, the response time of a duty-cycle change to a line-voltage change is independent of the output-voltage-feedback control loop bandwidth.

Moreover, by adding a non-linear gain control circuit, the DC gain of the DCM boost rectifier at light load is adaptively reduced so that the stability of the rectifier at light load is achieved.

BRIEF DESCRIPTION OF THE DRAWINGS

FIG. 2($a$) shows an implementation of a harmonic injection circuit 200.

FIG. 2($b$) shows waveforms 250-1 to 250-4 of harmonic injection circuit 200.

FIG. 10($a$) is a schematic diagram of one implementation of input voltage sensing and scaling circuit 814 of boost rectifiers 800 and 900.

FIG. 10($b$) shows phase voltages $V_{an}$, $V_{bn}$ and $V_{cn}$ (waveforms 1001, 1002 and 1003 ), line-to-line voltages $V_{ab}$, $V_{bc}$, and $V_{ca}$ (waveforms 1004, 1005 and 1006 ), rectified line voltage $V_d$ (waveform 1007) and output signal $V_S$ (waveform 1008) of sensing and scaling circuit 814.

FIG. 11($a$) is an implementation of integrator 815 with a reset circuit for providing an input signal to a pulse-width modulator.

FIG. 11($b$) shows, as voltage $V_S$ changes (waveform 1120), the slope of ramp voltage $V_{RAMP}^{FF}$ also changes (waveform 1121), causing a modulation of the boost-switch duty cycle (waveform 1122).

FIG. 12($a$) is a schematic diagram of an implementation of variable-gain amplifier (VGA) 816.

FIG. 12($b$) shows the output voltage $V_{inj}^{AMP}$ of VGA 816, as a function of scaled line input voltage $V_S$.

To facilitate comparison among the various figures and to simplify the detailed description, like elements in the various figures are provided like reference numerals.

DETAILED DESCRIPTION OF THE PREFERRED EMBODIMENTS

Figure 8:
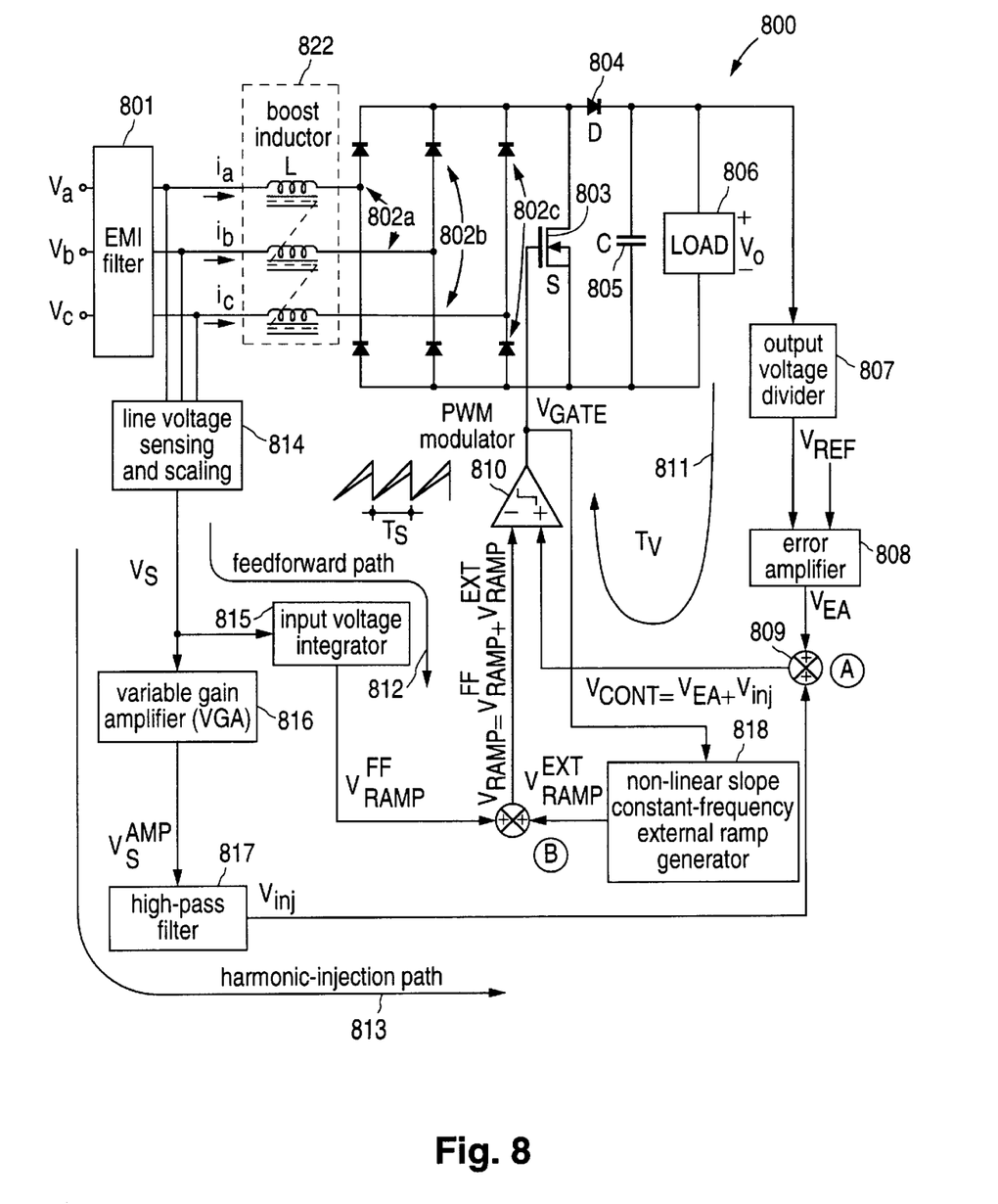
FIG. 8 is a block diagram of a single-switch, three-phase, DCM, HPF boost rectifier 800, including an input-voltage feed-forward control with direct harmonic injection, in accordance with a first embodiment of the present invention.
Figure 9:
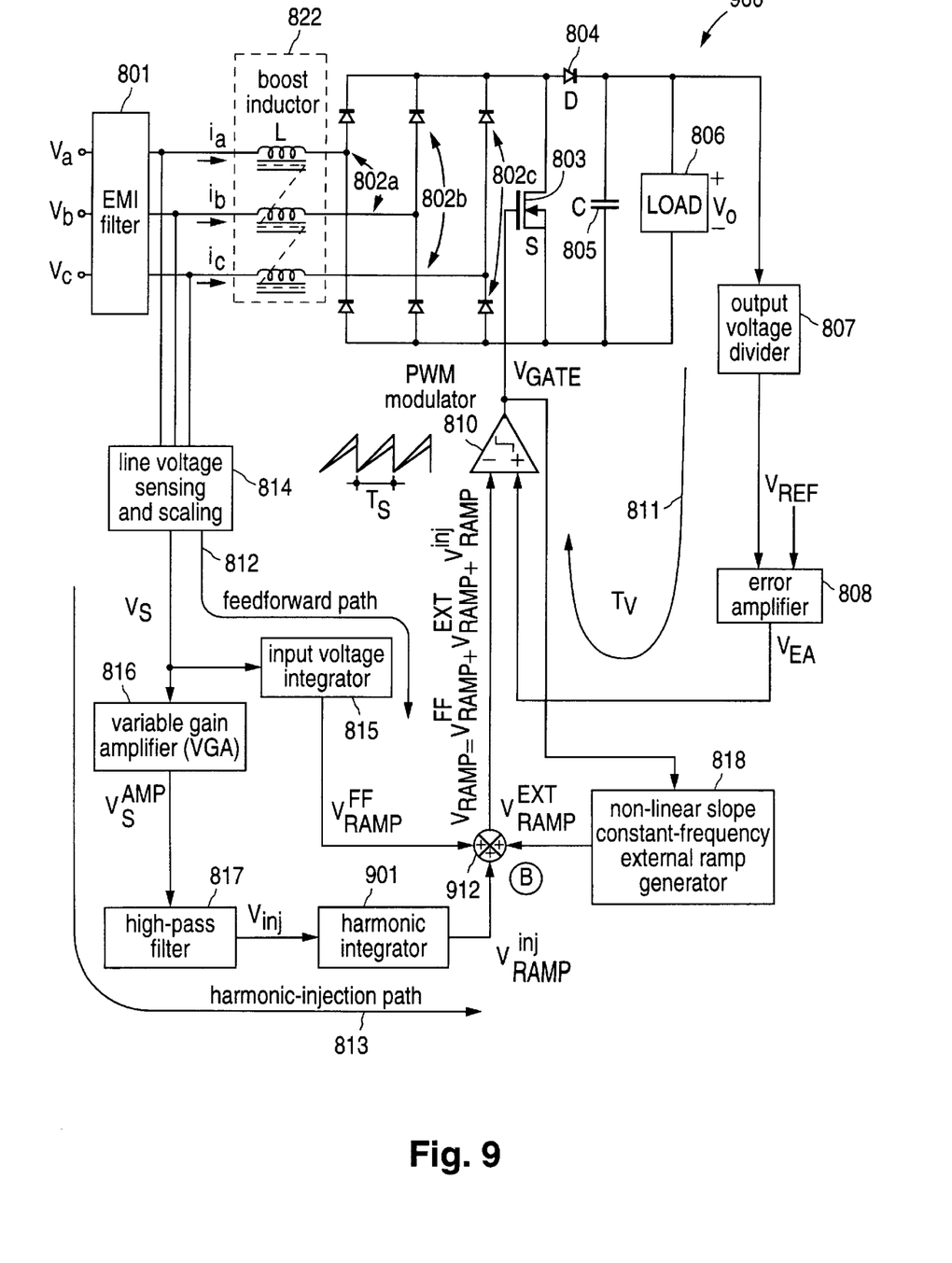
FIG. 9 is a block diagram of a single-switch, three-phase, DCM, HPF boost rectifier 900, with input-voltage feedforward control with integral harmonic injection, in accordance with a second embodiment of the present invention.

Under the present invention, by combining feedforward control with harmonic-injection, the performance of a three-phase, single-switch, DCM, PWM converter can be optimized to meet the IEC555-2 requirements, with an excellent transient response to a line-voltage change. FIGS. 8 and 9 are block diagrams of single-switch, three-phase, DCM, high-power-factor (HPF) boost rectifiers 800 and 900, including input-voltage feed-forward control with direct harmonic injection and integral harmonic injection, respectively, in accordance with first and second embodiments of the present invention.

In FIG. 8, three-phase DCM, HPF boost rectifier 800, which receives input power as voltages $V_a$, $V_b$ and $V_c$, includes electromagnetic interference (EMI) filter 801 for filtering the input signals, coupled boost inductors 822 for transient storage of the energy received from the input power source, bridge rectifiers 802a, 802b, and 802c for rectifying the filtered input voltage signals, control switch 803, diode 804 and output capacitor 805. Output capacitor 805 provides an output voltage $V_O$ across load 806.

Control switch 803 is controlled by pulse-width-modulated (PWM) modulator 810, which receives input signals from a feedback path 811, a feedforward path 812 and a harmonic injection path 813. Feedback path 811 includes voltage divider 807, error amplifier 808 coupled in a conventional feedback configuration described above in conjunction with FIG. 4. Feedforward path 812 and harmonic injection path 813 each receive the filtered line voltage, after being scaled by scaling and sensing circuit 814. The scaled input line voltage, which contains both a DC and a relatively small 360 Hz AC component, is integrated in integrator circuit 815 to generate a voltage ramp $V_{RAMP}^{FF}$ with a line-voltage-dependent slope. Voltage ramp $V_{RAMP}^{FF}$ is then summed with a nonlinear-slope, constant-frequency external voltage ramp $V_{RAMP}^{EXT}$ at the inverting input terminal of the PWM modulator 810. Consequently, the output voltage of feedforward path 812 contains an AC component proportional to the rectified-line voltage, and inherently possesses a harmonic-injection property which helps in reducing the $5^{th}$-order harmonic of the line current. However, since different integrator gains are required to optimize the AC injection signal for harmonic reduction, and to optimize the feedforward ramp slope to reduce line-voltage transients, feedforward path 812 and harmonic-injection path 813 are separately provided.

In the harmonic-injection path 813, the scaled input line voltage is amplified by the variable-gain amplifier (VGA) 816 to provide an amplified signal $V_S^{AMP}$, which is then filtered by high-pass filter 817 to remove the DC component, thus providing signal harmonic injection signal $V_{inj}$. In boost rectifier 800, harmonic injection signal $V_{inj}$ is directly summed with voltage $V_{EA}$ of feedback control path 811 to provide the input signal to the non-inverting terminal of PWM modulator 810.

Boost rectifier 900 differs from boost rectifier 800 in that the output signal of harmonic-injection path 813 is summed after an integration step in harmonic integrator 901 with, instead of voltage $V_{EA}$ of feedback control path 811, voltage $V_{RAMP}^{FF}$ of input voltage integrator 815 and voltage $V_{RAMP}^{EXT}$ of nonlinear-slope constant-frequency external ramp 818 at the non-inverting terminal of PWM modulator 810. The output signal $V_{RAMP}^{inj}$ of harmonic integrator 901 has a slope proportional to injection signal $V_{inj}$ at the output terminal of high-pass filter 817. Compared with boost rectifier 800, boost rectifier 900 is less sensitive to noise.

Figure 10A:
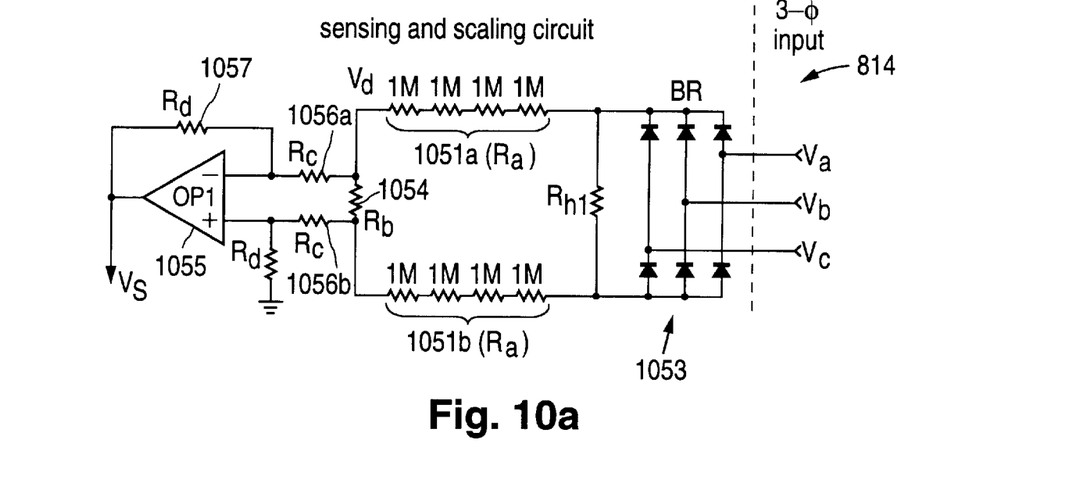
Figure 10B:
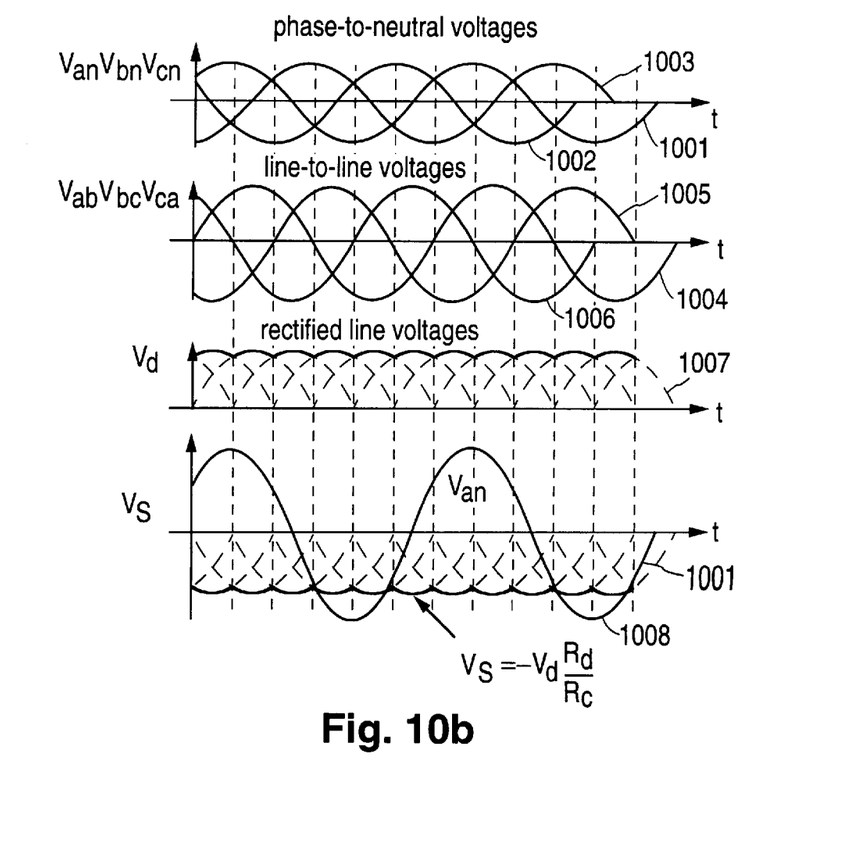

An implementation of line-voltage sensing and scaling circuit 814 is shown in FIG. 10(a). As shown in FIG. 10(a), three-phase input voltage (i.e., voltages $V_a$, $V_b$ and $V_c$) is rectified as rectified voltage $V_d$ by bridge rectifiers 1053, and isolated from control ground by 4 MΩ resistors 1051 a ($R_a$) and 1051 b ($R_a$) Voltage $V_d$ is attenuated by the voltage divider formed by resistors 1054 ($R_b$), 1051 a and 1051 b and then scaled by operational amplifier 1055 and resistors 1056 a ($R_c$) 1056 b ($R_c$), and 1057 ($R_d$) to provide output voltage $V_S=-V_d R_d/R_c$. FIG. 10(b) shows phase voltages $V_{an}$, $V_{bn}$ and $V_{cn}$ (waveforms 1001, 1002 and 1003), line-to-line voltages $V_{ab}$, $V_{bc}$, and $V_{ca}$ (waveforms 1004, 1005 and 1006), rectified line voltage $V_d$ (waveform 1007) and output signal $V_S$ (waveform 1008) of sensing and scaling circuit 814.

Scaled input voltage $V_S$ carries both the information about the peak input voltage and the AC component of the rectified three-phase input voltage. Since harmonic-injection path 813 does not include a bandpass filter, signal $V_S$, which contains $6^{th}$ and higher-order harmonics, does not suffer from any significant delay. As a result, the phase of injection signal $V_S$ is naturally well synchronized with the input currents and line-to-neutral voltages. Moreover, this phase synchronization does not drift with time and is relatively insensitive to component tolerances.

Figure 11A:
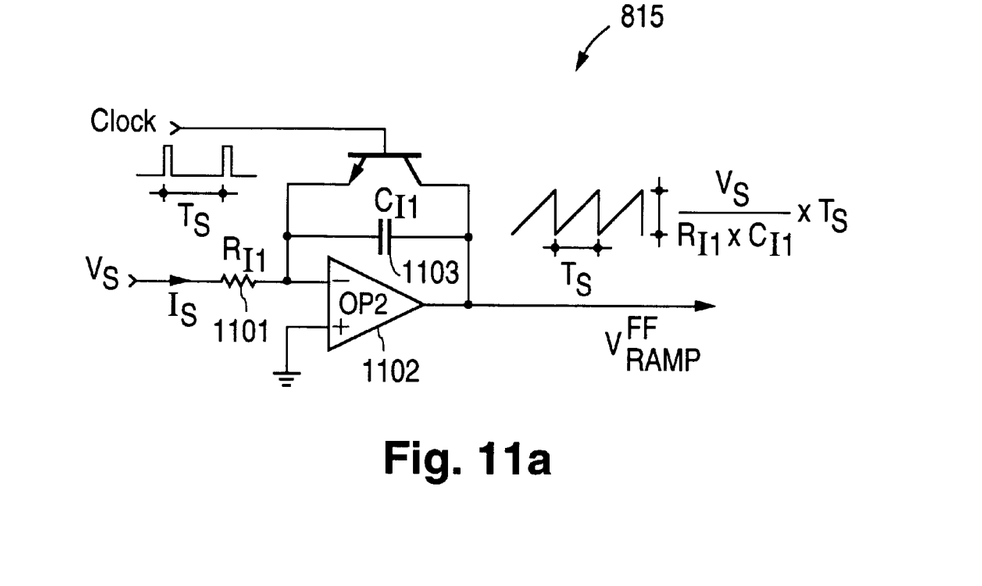
Figure 11B:
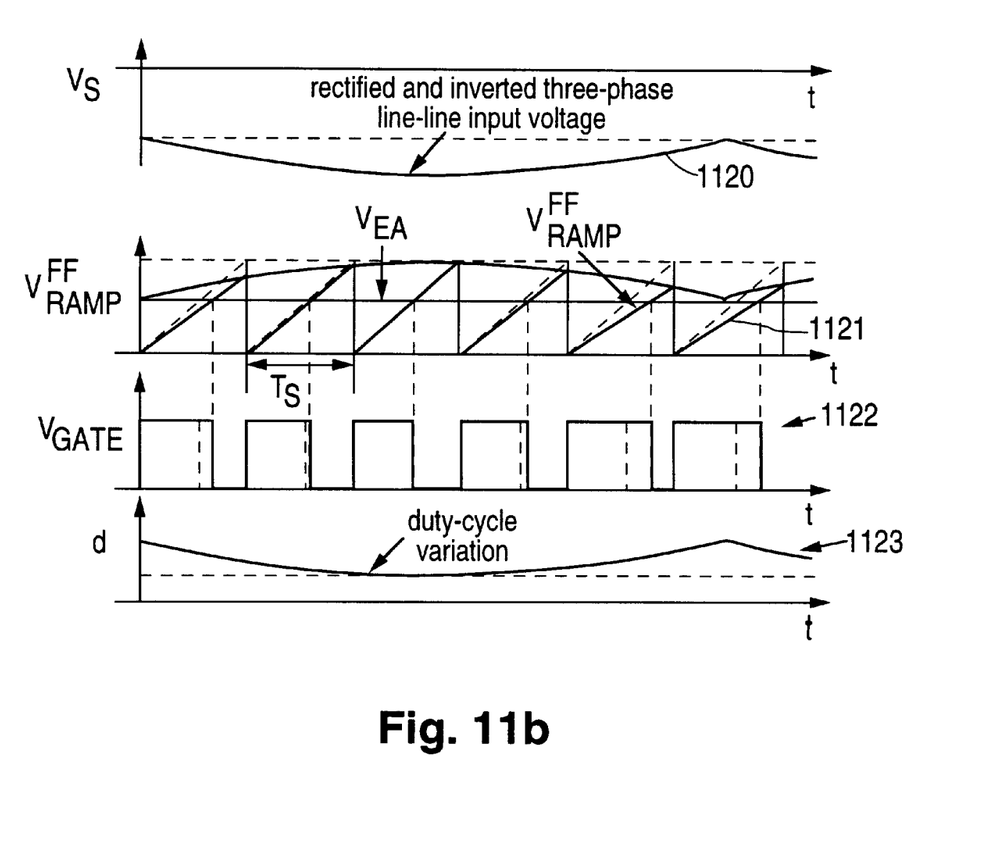

FIG. 11(a) shows an implementation of feedforward integrator 815, including resistor 1101 ($R_S$), operational amplifier 1102 and capacitor 1103 ($C_{f1}$). In integrator 815, capacitor 1103 is charged by current $I_S=V_S/R_{f1}$ during a switching period, and discharged by a clock pulse at the end of the switching period. Due to the short discharge time, the waveform at the output terminal of integrator 815 is sawtooth ramp voltage $V_{RAMP}^{FF}$. FIG. 11(b) shows, as voltage $V_S$ changes (waveform 1120), the slope of ramp voltage $V_{RAMP}^{FF}$ also changes (waveform 1121) causing a modulation of the boost-switch duty cycle (waveform 1122). In FIG. 11(b), scaled voltage $V_S$ changes because of an AC component in the rectified line voltage. As discussed above, feedforward path 812 is intended to improve the transient response of boost rectifier 800 or 900 to line-voltage changes, and not to serve as a harmonic injection path. In fact, the modulation index of the injected signal cannot be optimized using integrator 815 because different integrator gains are required for the optimal feedforward ramp and the optimal modulation index of the injection signal. To optimize modulation index m as a function of M, the AC component of sensed input voltage $V_S$ is properly amplified and included into the input signals of PWM modulator 810 via harmonic injection path 813.

Figure 12A:
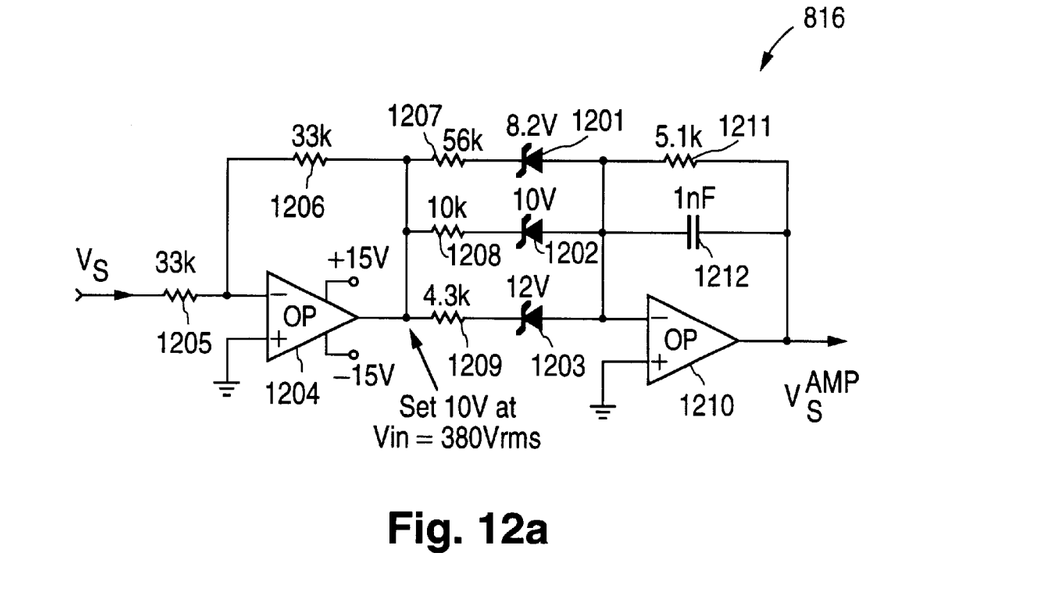

FIG. 12(a) shows the schematic diagram of an implementation of variable-gain amplifier (VGA) 816 of boost rectifiers 800 and 900. VGA 816 generates an output voltage $V_S^{AMP}$, which corresponds to an approximate optimal modulation m index for injected signal $V_{inj}$. As shown in FIG. 12(a), VGA 816 includes a first unit-gain amplifier formed by operational amplifier 1204, and resistors 1205 and 1206, and a second amplification stage, which includes operational amplifier 1210, capacitor 1212, resistors 1211, 1207, 1208, 1209, and Zener diodes 1201, 1202 and 1203 having, respectively, breakdown voltages 8.2 volts, 10 volts and 12 volts. Accordingly, as each of Zener diodes 1201, 1202 and 1203 becomes conducting (i.e., as sensed voltage $V_S$ increases), the gain of VGA 816 increases.

Figure 12B:
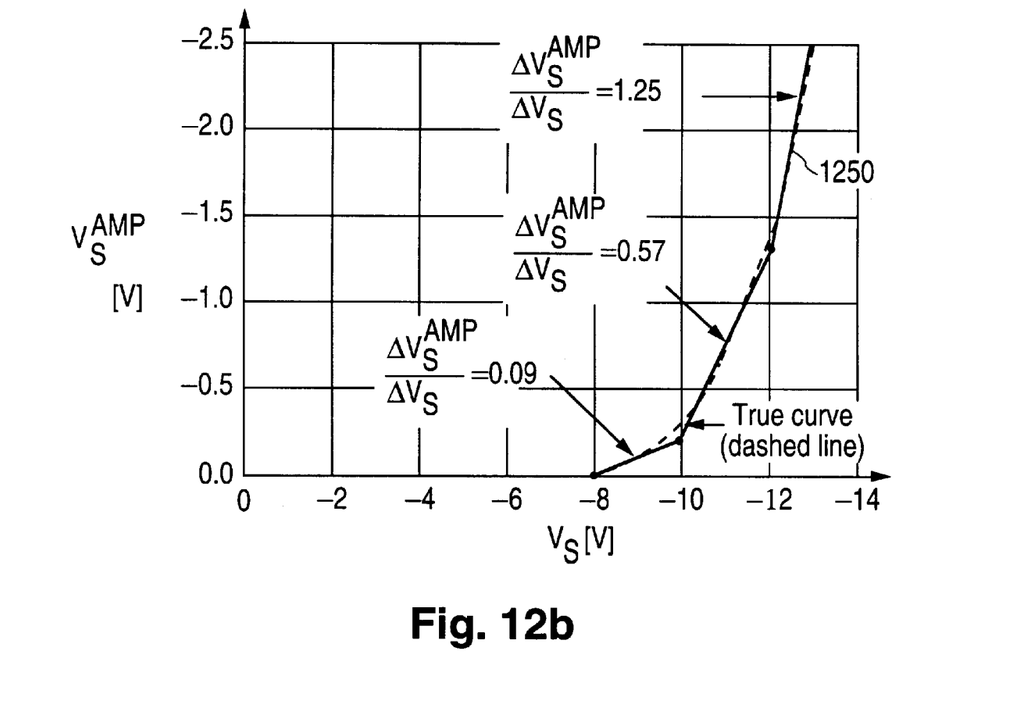

FIG. 12(b) shows the output voltage $V_S^{AMP}$ of VGA 816, as a function of scaled line input voltage $V_S$. As shown in FIG. 12(b), VGA 816 has four distinct regions of operation. When sensed input voltage $V_S$ is less than 8.2 volts, which approximately corresponds to the low line voltage of 304 $V_{(L-L,rms)}$, output voltage $V_S^{AMP}$ of the VGA is close to zero. When sensed voltage $V_S$ is greater than 8.2 V but less than 10 volts, which corresponds to the nominal line voltage of 380 $V_{(L-L,rms)}$, the voltage gain of the circuit is approximately 0.09 (i.e., the ratio of resistors 1211 (5.1 kΩ) and 1207 (56 kΩ). Similarly, when sensed input voltage $V_S$ is larger than 10 volts but smaller than 12 volts which corresponds to high line voltage of 456 $V_{(L-L,rms)}$, the voltage gain of VGA 816 is approximately 0.57 (i.e., the ratio of resistor 1211 (5.1 kΩ) and parallel resistors 1208 (10 kΩ) and 1207 (56 kΩ). When sensed voltage $V_S$ is greater than 12 V, the gain of VGA 816 is 1.25. (i.e., the ratio of resistor 1211 (5.1 kΩ) and parallel resistors 1209 (4.3 kΩ), 1208 (10 kΩ) and 1207 (56 kΩ). Since the transition of a Zener diode from a reversed-biased non-conducting region to an avalanche region is not abrupt but gradual, the output voltage $V_S^{AMP}$ of VGA 816 is not piecewise linear but a continuous curve relative to scaled line input voltage $V_S$, as indicated by curve 1250 of FIG. 12(a).

Figure 13A:
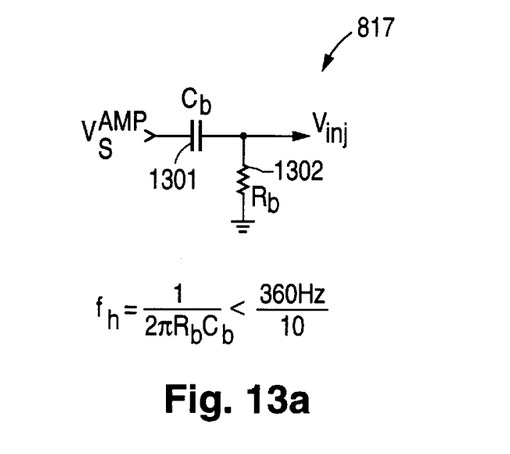
FIG. 13(a) is a schematic diagram of an implementation of high-pass filter 817.
Figure 13B:
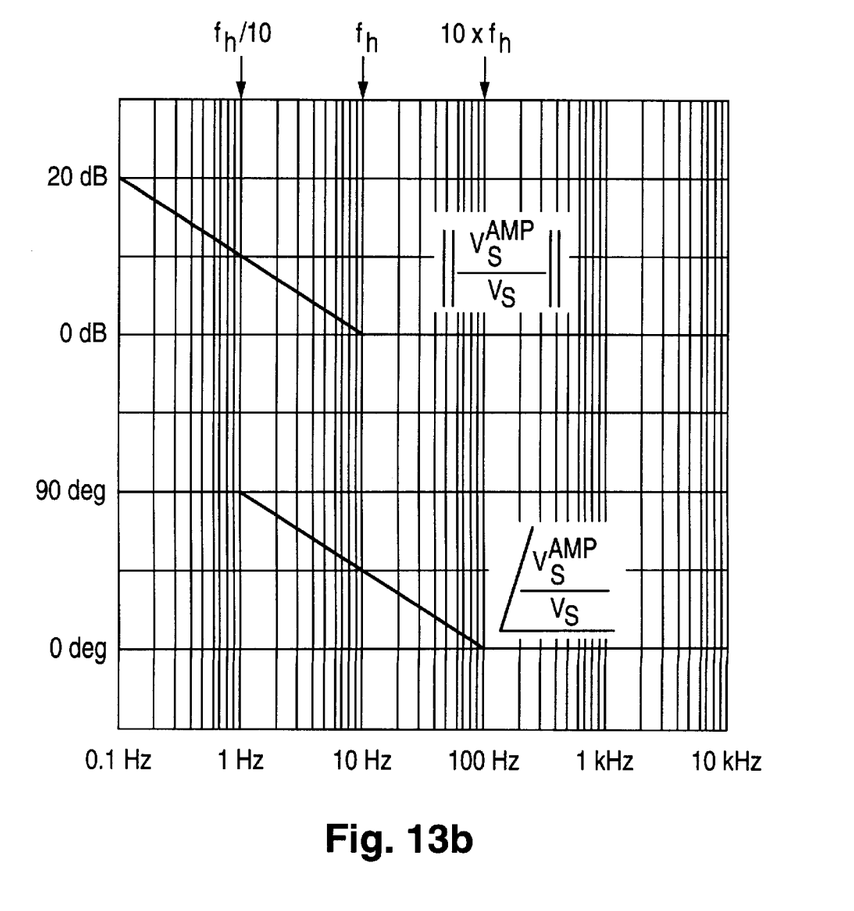
FIG. 13(b) shows the gain and phase of the output voltage of high-pass filter 817, as a function of frequency.

FIG. 13(a) shows a schematic diagram of an implementation of high-pass filter 817. High-pass filter 817 includes capacitor 1301 ($C_b$) and filter resistor 1302 ($R_b$). In high-pass filter 817, the DC component of rectified voltage $V_S^{AMP}$ is eliminated by blocking capacitor 1301. Since the impedance of blocking capacitor 1301 at the line frequency is much smaller than the resistance of resistor 1302, the voltage across resistor 1302 is substantially the same as the AC component of voltage $V_S^{AMP}$. FIG. 13(b) shows the gain and phase of the output voltage of high-pass filter 817, as a function of frequency. As shown in FIG. 13(b), the phase values of output voltage $V_{inj}$ at frequencies above 100 Hz is zero because the cut-off frequency $f_h$ of high-pass filter 817 is below 10 Hz. As a result, the scaled AC component of the rectified three-phase line-to-line input-voltages which contains the $6^{th}$- and higher-order harmonics can pass through high-pass filter 817 without a phase shift.

Figure 14:
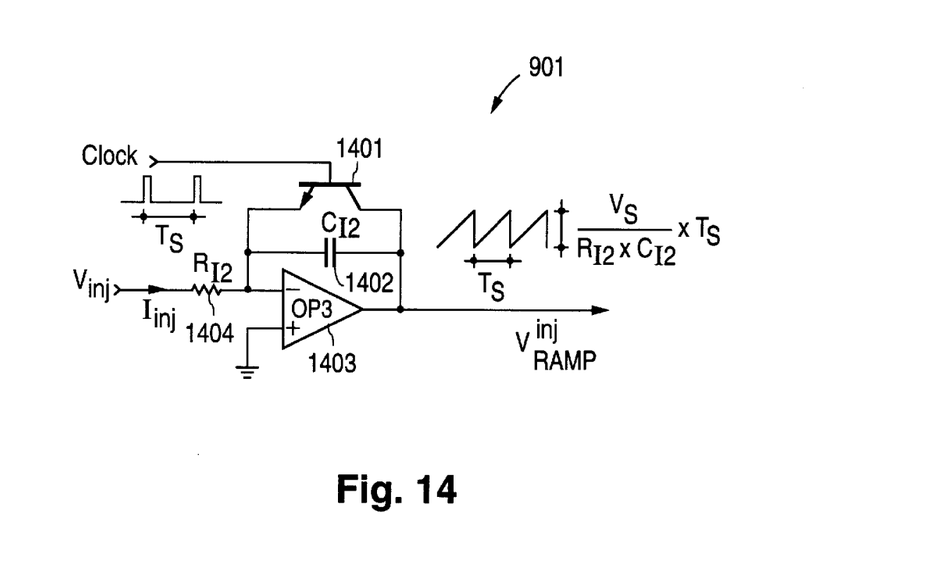
FIG. 14 shows an implementation of harmonic integrator 901.

Harmonic integrator 901 can be implemented by the circuit shown in FIG. 14, which is structurally similar to the implementation of feedforward integrator 815 shown in FIG. 11(a).

Figure 15:
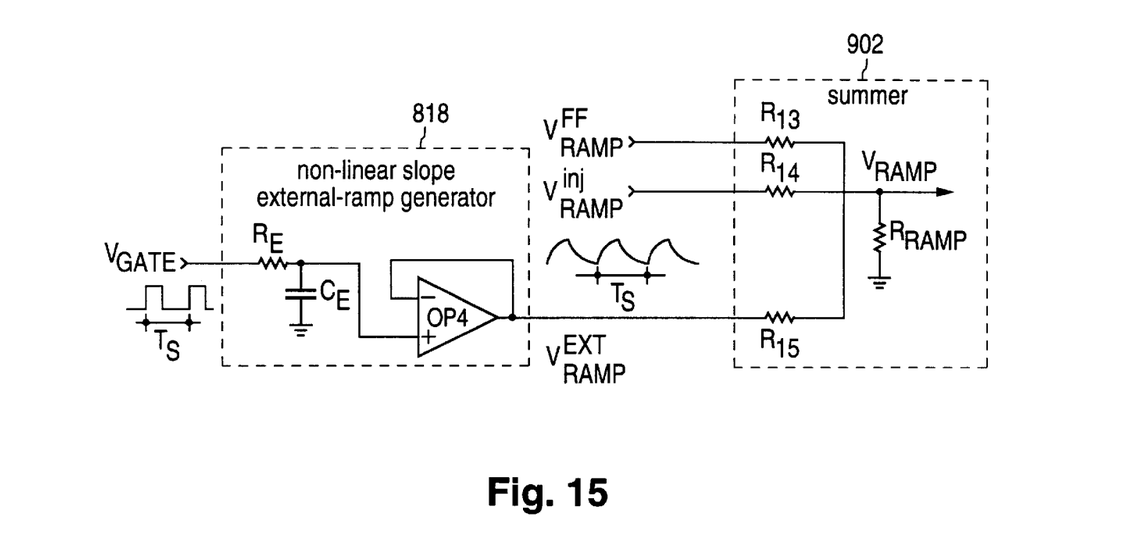
FIG. 15 shows an implementation of nonlinear-slope external-ramp generator 818 and summer 902.

FIG. 15 shows an implementation of a nonlinear-slope external-ramp generator. As shown in FIG. 15 the external ramp $V_{RAMP}^{EXT}$ is the exponential waveform which has a nonlinear voltage rate of change (dv/dt) over a switching period. As a result, at a light load (i.e., when the duty cycle of the DCM boost rectifier is very small), the voltage rate of change of the external ramp $V_{RAMP}^{EXT}$ is much greater than at full load. Since the DC gain of the rectifier is inversely proportional to the slope of the ramp signal, the high DC gain of the DCM boost rectifier at a light load is automatically compensated.

Figure 16:
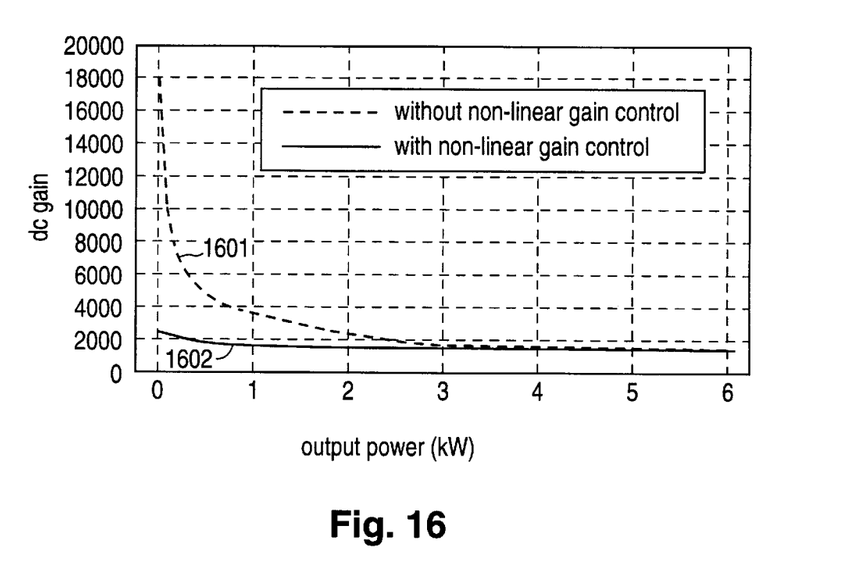
FIG. 16 shows DC gain versus output power of the DCM boost rectifier without nonlinear gain control (curve 1601) and with nonlinear gain control (curve 1602).
Figure 17:
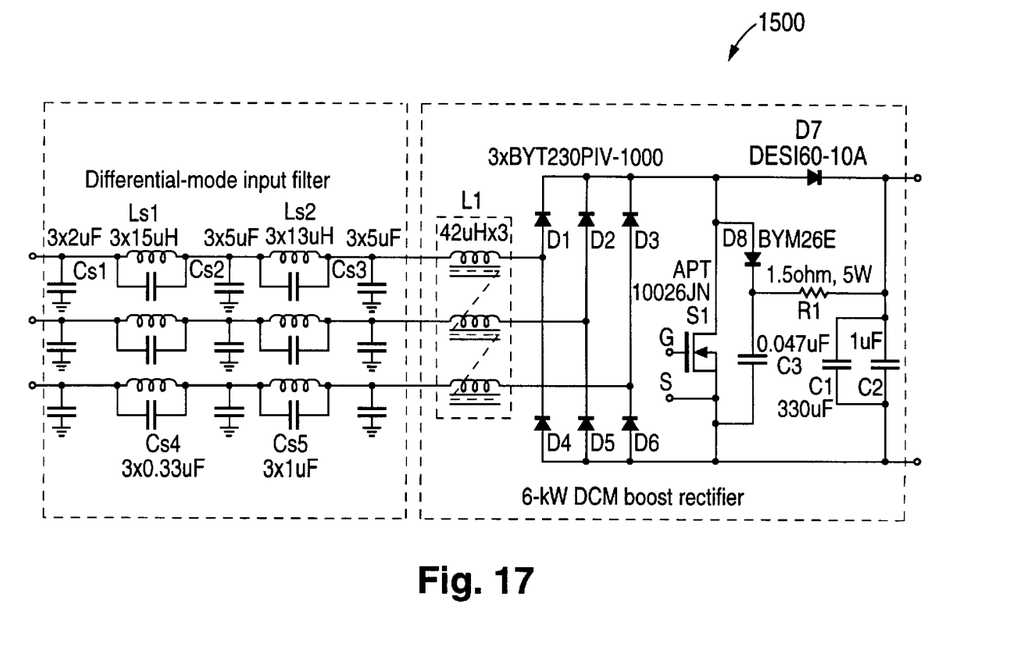
FIG. 17 shows a detailed schematic diagram of an experimental 6-kw, single-switch, 3-phase, DCM boost rectifier 1500, in accordance with the present invention.
Figure 18:
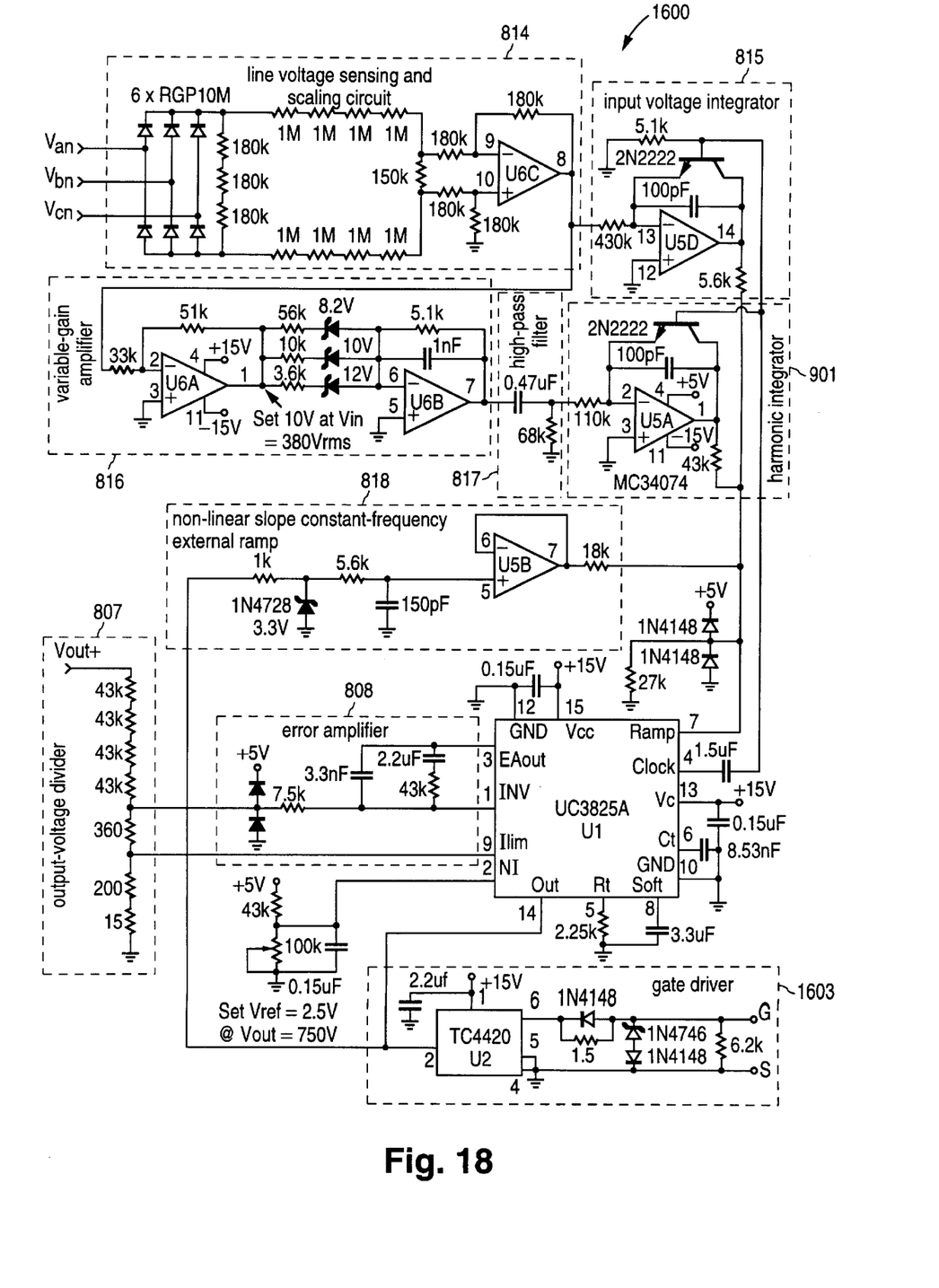
FIG. 18 is a detailed schematic diagram of the feedforward control and harmonic injection circuit 1600 of DCM boost rectifier 1500.

FIG. 16 shows the calculated DC gain of the rectifier without and with the nonlinear gain control as a function of the output power. As shown in FIG. 16, with the nonlinear gain control, the DC gain is much reduced at lower power levels.

To verify the performance of the proposed input-voltage feedforward control technique with harmonic injection, a three-phase, 6-kW, DCM boost rectifier for 304 $V_{RMS}$–456 $V_{RMS}$ line-to-line input voltage range and $V_O$=750 $V_{DC}$ was built, in accordance with the present invention described above. Detailed circuit diagrams of power stage 1500 and control circuit 1600 are provided in FIG. 15 and FIG. 16. Rectifier 1500 was designed with a constant switching frequency of 45 kHz.

Control circuit 1600 was designed around a UC3825 PWM circuit. In fact, the UC3825 circuit (i.e., circuit 1601) is used only to setup the switching frequency, and to provide a gate-drive signal for the TC4420 MOSFET driver (i.e., circuit 1603). The other circuits in control circuit 1600 were implemented using discrete components. Table 1 shows the measured rms input-current harmonics of 6-kW experimental converter 1500 at the full load and at different input voltages. As shown in Table 1, rectifier 1500 meets the IEC555-2 harmonic limits over the entire line-voltage range of 304–456 $V_{rms(LL)}$. The minimum THD of 7.52% occurs at low line voltage (304 $V_{rms(L-L)}$) while the maximum THD of 15.74% occurs at high line voltage (456 $V_{rms(L-L)}$). Table 2 shows the measured full-load voltage overshoots of output voltage $V_o$ for different line transients under harmonic-injection control, comparing the input-voltage feedforward technique of the present invention to conventional harmonic-injection control techniques without input-voltage feedforward. As shown in Table 2, the present significantly reduces the output voltage overshoot.

TABLE 1

Measured input-current harmonics of the experimental, 6-kW, DCM, boost rectifier with the harmonic-injection control with feedforward at full-power and different input voltages.

| harmonic number | three-phase input voltages | | | | | IEC555-2 limits |
|---|---|---|---|---|---|---|
| | 456 $V_{rms(LL)}$ | 417 $V_{rms(LL)}$ | 380 $V_{rms(LL)}$ | 340 $V_{rms(LL)}$ | 304 $V_{rms(LL)}$ | |
| 1   | 7.72 A  | 8.4 A   | 9.19 A  | 10.28 A | 11.3 A  |         |
| 3   | 0.12 A  | 0.12 A  | 0.08 A  | 0.00 A  | 0.06 A  | 2.3 A   |
| 5   | 1.01 A  | 0.78 A  | 0.74 A  | 0.61 A  | 0.59 A  | 1.14 A  |
| 7   | 0.49 A  | 0.63 A  | 0.56 A  | 0.65 A  | 0.60 A  | 0.77 A  |
| 9   | 0.04 A  | 0.02 A  | 0.02 A  | 0.01 A  | 0.02 A  | 0.4 A   |
| 11  | 0.07 A  | 0.08 A  | 0.02 A  | 0.01 A  | 0.02 A  | 0.33 A  |
| 2   | 0.18 A  | 0.15 A  | 0.13 A  | 0.12 A  | 0.11 A  | 1.08 A  |
| 4   | 0.22 A  | 0.2 A   | 0.17 A  | 0.16 A  | 0.14 A  | 0.43 A  |
| 6   | 0.01 A  | 0.01 A  | 0.00 A  | 0.01 A  | 0.01 A  | 0.3 A   |
| 8   | 0.01 A  | 0.04 A  | 0.01 A  | 0.02 A  | 0.01 A  | 0.23 A  |
| 10  | 0.05 A  | 0.01 A  | 0.03 A  | 0.01 A  | 0.01 A  | 0.184A  |
| THD | 15.74%  | 12.86%  | 10.93%  | 9.23%   | 7.52%   |         |

TABLE 2

Measured full-load overshoots of the output voltage for different line transients.

| Line-voltage transient $V_{(L-L,rms)min}$ – $V_{(L-L,rms)max}$ | Output-voltage overshoot without feedforward $\Delta V_O(V)$ | Output-voltage overshoot with feedforward $\Delta V_{O(FF)}(V)$ |
|---|---|---|
| 304–340 | 35  | 18 |
| 304–380 | 78  | 30 |
| 304–417 | 114 | 45 |
| 304–456 | 155 | 62 |

The above detailed description is provided to illustrate the specific embodiments of the present invention and is not intended to be limiting. Numerous modifications and variations within the scope of the present invention are possible. The present invention is set forth in the following claims.

We claim:

1. A control circuit for controlling a single-switch boost rectifier, said single-switch boost rectifier receiving a three-phase AC input signal and providing a rectified output signal, said control circuit comprising:
   an output feedback circuit receiving said rectified output signal of said single-switch boost rectifier and a reference signal, and providing an error signal representing a voltage difference between said rectified output signal and said reference signal;
   a feedforward control circuit coupled to receive said three-phase AC input signal and providing a variable-slope ramp signal having a slope dependent upon a magnitude of said three-phase AC input signal;
   a ramp voltage generator providing a nonlinear-slope ramp signal;
   a summer summing said variable-slope ramp signal and said nonlinear-slope ramp signal to provide a third ramp signal; and
   a pulse-width-modulated (PWM) modulator coupled to receive said third ramp signal and said error signal to provide a signal for switching said single-switch boost rectifier.

2. A control circuit as in claim 1, further comprising a harmonic-injection circuit coupled to receive said three-phase AC input signal to provide a harmonic signal for controlling said PWM modulator.

3. A control circuit as in claim 2, wherein said harmonic-injection circuit comprises:
   a variable-gain amplifier ; and
   a high-pass filter.

4. A control circuit as in claim 3, wherein said harmonic signal for controlling said PWM modulator is summed with said error signal.

5. A control circuit as in claim 3, further comprising an integrator, wherein said harmonic signal for controlling said PWM modulator is integrated and summed in said summer with said variable-slope ramp signal and said nonlinear-slope ramp signal.

6. A control circuit as in claim 1, wherein said feedforward control circuit comprises an integrator.

7. A control circuit as in claim 2, further comprising a scaling circuit for scaling said three-phase AC input signal prior to input to said feedforward control circuit and to said harmonic-injection circuit.

8. A control circuit as in claim 3, wherein said variable-gain amplifier comprises a gain stage including a plurality of zener diodes each having a different predetermined breakdown voltage.

9. A control circuit as in claim 5, wherein said feedforward control circuit further comprises an integrator, said integrator comprising:
   an operational amplifier with a non-inverting input terminal coupled to a ground reference voltage;
   a resistor coupled between an input terminal of said integrator and an inverting terminal of said operational amplifier;
   a capacitor coupled across said inverting input terminal of said operational amplifier and an output terminal of said operational amplifier; and
   a transistor controlled by a clock signal, said transistor coupled across said capacitor for discharging said capacitor upon said clock signal being asserted.

10. A control circuit as in claim 1, wherein an output terminal of said PWM modulator is coupled to said ramp voltage generator to provide an exponential voltage signal to said summer.

* * * * *